United States Patent [19]

Westerkowsky

[11] 3,792,267

[45] Feb. 12, 1974

[54] AUTOMATIC X-RAY EXPOSURE DEVICE

[75] Inventor: Kurt Westerkowsky, Hamburg, Germany

[73] Assignee: U.S. Phillips Corporation, New York, N.Y.

[22] Filed: Dec. 3, 1971

[21] Appl. No.: 204,476

[30] Foreign Application Priority Data

Dec. 18, 1970 Germany ........................ 2062633

[52] U.S. Cl. ........................ 250/322, 250/384

[51] Int. Cl. ........................ H01g 1/28

[58] Field of Search ........................ 250/95

[56] References Cited

UNITED STATES PATENTS 3,356,847 12/1967 Splain ........................ 250/95

3,103,590 9/1963 Berglund et al. ........................ 250/95

3,573,461 4/1971 Ohlsson ........................ 250/95

*Primary Examiner*—James W. Lawrence

*Assistant Examiner*—B. C. Anderson

*Attorney, Agent, or Firm*—Frank R. Trifari

[57] ABSTRACT

An automatic X-ray exposure device includes a radiation detector which supplies an output current proportional to the amount of X-ray energy impinging upon the film. An integrating circuit is responsive thereto to produce a signal corresponding to the accumulated X-ray energy on the film. A logarithmic amplifier is connected to the integrating circuit so as to derive a control signal proportional to the logarithm of the integrated signal. The control signal is used to automatically terminate the X-ray exposure.

8 Claims, 4 Drawing Figures

INVENTOR.
KURT WESTERKOWSKY
BY
AGENT

INVENTOR.
KURT WESTERKOWSKY

BY
AGENT

AUTOMATIC X-RAY EXPOSURE DEVICE

The invention relates to an automatic X-ray exposure device comprising a radiation detector which is arranged between an object to be radiographed and a film and which generates a signal which is proportional to a dose measured behind the object, and a switch which is controlled by the dose-dependent signal and which terminates the exposure as soon as the signal reaches a predetermined value.

However, in the case of radiation detectors supplying an output signal which is proportional to the dose power, the output signal has to be integrated. In an ionization chamber which generates an ionization current proportional to the dose power, a capacitor is therefore incorporated which is charged by the ionization current so that the voltage on the capacitor is proportional to the dose.

The dose or the value of the signal at which the exposure is to be terminated by the switch depends on the properties of the film and of the intensifying foil, of the desired film density and of the voltage at the X-ray tube.

The greatest effect on the switch-off dose (the term switch-off dose is to be understood to mean herein the desired dose to which an object is exposed for a desired period of time after which exposure is terminated by the switch) is exerted by the properties of the film intensifying-foil combination. Due to the dependence of the switch-off dose on the properties of the film-foil combination, the switch-off dose must be increased considerably more when using a film-foil combination of low intensification than when using a film-foil combination of high intensification, if the density is to be increased by the same amount in both cases. For example, when the voltage proportional to the switch-off dose at a given density amounts to 20 volts in the case of a film-foil combination of low intensification, and this voltage amounts to 10 volts in the case of a film-foil combination of high intensification, the voltage proportional to the switch-off dose (switch-off voltage) of the film-foil combination of low intensification is to be increased, for example, by two volts in order to achieve a given density increase, while the switch-off voltage of the high-intensification film-foil combination is to be increased only by one volt for achieving the same density increase. This makes it more difficult to control the switch for terminating the exposure. A similar reasoning applies to automatic X-ray exposure devices in which the signal proportional to the dose is quantized, i.e. in which a number of pulses of the same amplitude and proportional to the dose or to the signal proportional to the dose is generated as described in German Offenlegungsschrift 1,916,321, because in the case of different film-foil combinations a different number of pulses is to be additionally counted so as to achieve the same density variation. For this reason in known automatic exposure devices usually only one given, predetermined film-foil combination is used.

In principle, the same effect is also exerted by the dependency of the switch-off dose on the voltage at the X-ray tube, which, moreover, is also determined by the construction of the radiation detector. When different voltages are used at the X-ray tube, the switch-off dose need not be varied to the same degree for reaching the same density as when different film-foil combinations are used (in a tested automatic exposure device the variation of the switch-off dose was found to relate to the voltage variation as 1 : 2), but for other reasons it is not possible to use only one voltage.

An object of the invention is to provide an automatic X-ray exposure device in which the switch for terminating the exposure can be controlled in a simpler manner than in known automatic exposure devices.

In an automatic X-ray exposure device of the kind set forth this object is achieved according to the invention in that a device for forming the logarithm of the signal proportional to the dose is provided which forms a signal which is proportional to the logarithm of the dose when a given reference dose is exceeded, and which controls the switch-off device therewith.

In X-ray technology devices are known in which the logarithm of a quantity is also formed, for example, the logarithm of the mAs product. This logarithm, however, is used only in relation to the logarithm of a further quantity, for example, the logarithm of the voltage at the tube, in order to generate, for example, by summation a voltage which is proportional to the logarithm of the product of both these quantities, for example, a voltage which is proportional to the logarithm of the tube load.

In order that the invention may be readily carried into effect, one embodiment thereof will now be described in detail, by way of example, with reference to the accompanying diagrammatic drawings, in which.

Figure 1:
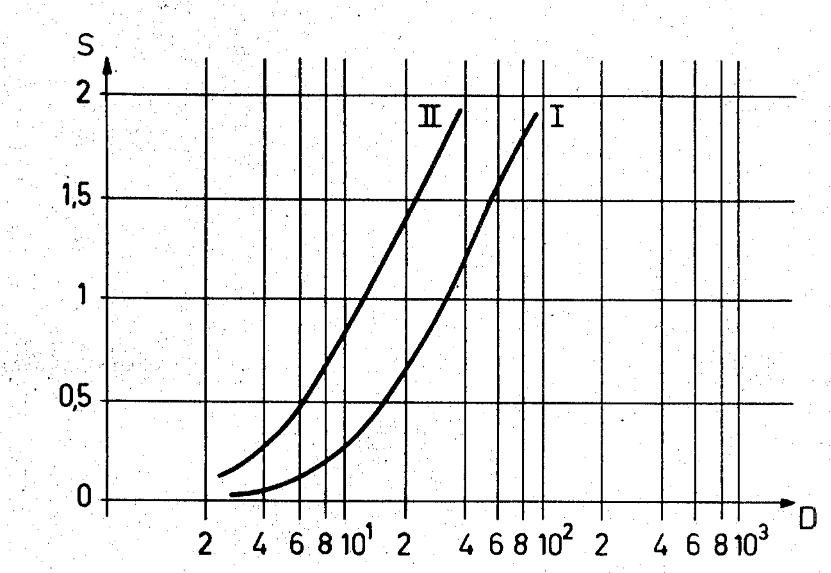
FIG. 1 shows the density curves of two different film-foil combinations.

The object of the invention will be described with reference to FIG. 1 which shows the density curves I and II of a film having a high-resolution intensifying foil (I) and a film having a high-intensification intensifying foil (II). The density curves illustrate the dependency of the density of the film (the density is the logarithm to base 10 of the quotient of the amount of light incident on the film to the amount of light transmitted by the film) on the radiation dose incident to the film or the film-foil combination. The radiation dose is shown on a logarithmic scale. The variation of the density curves is typical for all curves of this kind. Above a given value the density first increases slowly after which is passes — in the logarithmic representation — through a linear portion which is adjoined by a slightly using portion (not shown). For the exposure of the film generally only the linear portion of the density region is utilized. Also typical is that, at least in the linear portion, the slope of the density curve is practically the same for different film-foil combinations, so that the curves I and II extend practically parallel to each other. This also applies to the variation of the density curves when one film-foil combination is used with different X-ray tube voltages. However, in that case the distance between both density curves is not as large as in the case of two different film-foil combinations measured at one tube voltage. The drawing shows that the density increases by the same degree in both curves when the logarithm of the dose is increased by the same amount. Consequently, if the voltage controlling the exposure switch were proportional to the logarithm of the dose, the density would be increased by the same degree, at two different film-foil combinations or at two different voltages, if the switchoff voltages were increased by the same amount in both cases.

Figure 2:
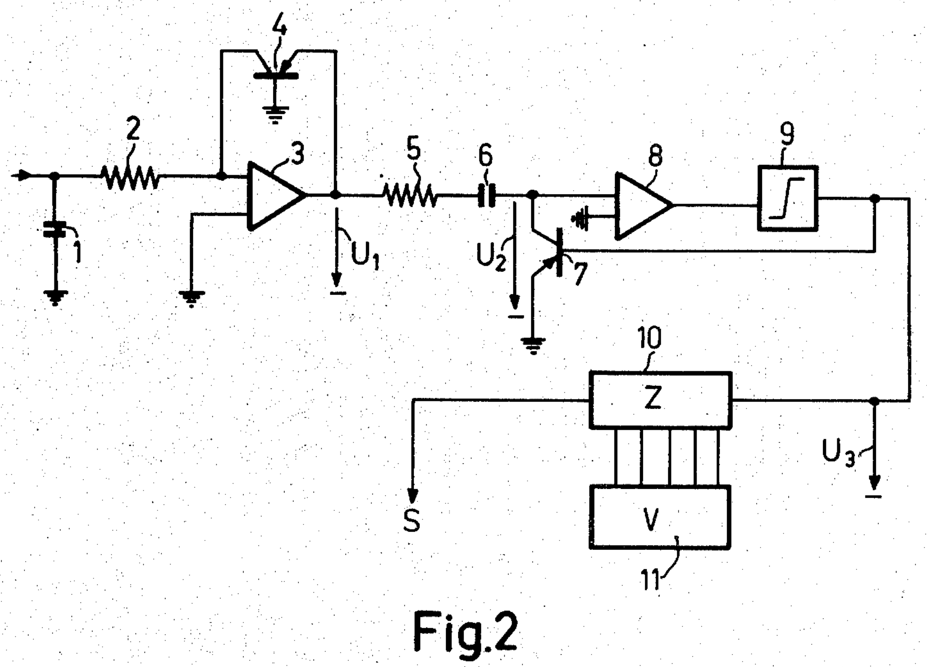
FIG. 2 shows a circuit diagram of the automatic X-ray exposure device according to the invention.
Figure 3A:
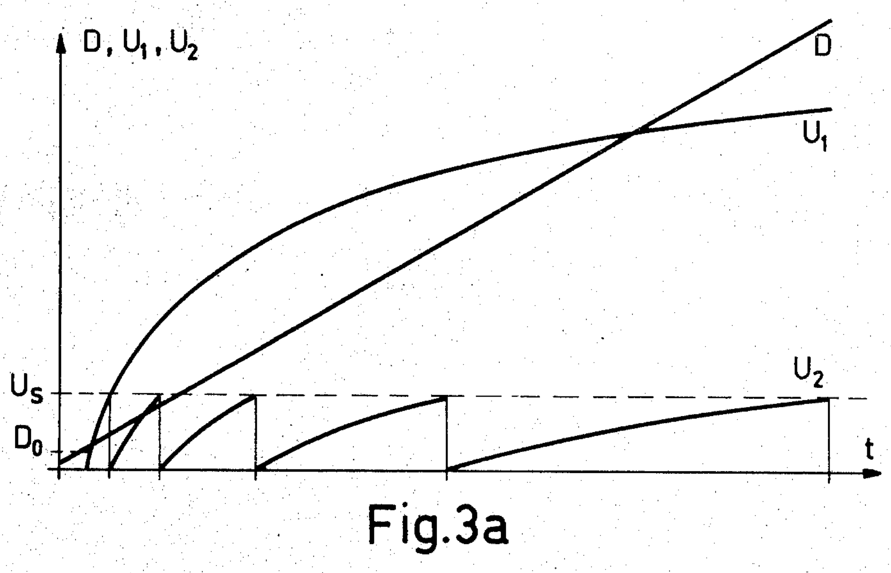
FIGS. 3*a* and 3*b* show the variation of the voltages of the various sections of a device according to the invention as a function of the time.

FIG. 2 shows a portion of an automatic X-ray exposure device according to the invention. Therein a capacitor 1 is charged by the ionization current which is supplied, possibly after amplification, by the ionization chamber, not shown. It is assumed that the X-ray tube is operated at constant current and constant voltage. This assumption is not important for the function of the automatic exposure device itself, but it facilitates the explanation. The dose power or the ionization current supplied by the ionization chamber is then constant so that the voltage on the capacitor 1 increases linearly with time (compare FIG. 3*a*, curve D which represents the variation with time of the dose or the voltage on the capacitor 1). The voltage is applied, via a resistor 2, to the input of an operational amplifier 3. By means of a transistor 4, which feeds back the output voltage of the operational amplifier to the input thereof, this operational amplifier is extended to form a logarithmic amplifier. Logarithmic amplifiers are known and amplifiers of this kind which have a range covering various decades are commercially available. In this context it is not necessary to elaborate on their construction. A bias voltage is applied to the logarithmic amplifier 3, such that the amplifier starts the formation of the logarithm of the capacitor voltage, referred to the voltage generated by a dose $D_o$ only when a given voltage on the capacitor 1 is exceeded or when a given dose $D_o$ is exceeded (compare FIG. 3*a*, curve D). The voltage $u_1$ at the output of the logarithmic amplifier 3, 4, therefore, varies as shown in FIG. 3*a*. It is applied, via the series connection of a resistor 5 and a capacitor 6, to the input of an amplifier 8 having an adjustable amplification factor. The collector-emitter path of transistor 7 is connected in parallel with the high-ohmic input of the amplifier 8. The output of the amplifier 8 is connected to the input of a threshold-value switch 9, which produces a pulse of a given duration when a given amplitude of the input voltage is exceeded. The output pulses of the threshold-value switch 9 are applied to a counting circuit 10 and to the base of the transistor 7.

By means of the structural elements 5 to 9 it is achieved that the signal is quantized, i.e. an output pulse is generated each time that the logarithm of the dose has increased by an adjustable, constant amount. The operation of the circuit is as follows: At the beginning, when the voltage $u_1$ is 0, the voltage $u_2$ at the input of the amplifier 8 is also 0. The voltage $u_2$ initially varies in accordance with the voltage $u_1$ because the capacitor 6 cannot be charged via the high-ohmic input of the amplifier 8 or the parallel-connected collector-emitter path of the cut-off transistor 7. As soon as the voltage at the input of the amplifier 8 reaches a given value, the threshold-value switch 9 supplies a pulse of constant duration. This pulse drives the transistor 7 into conduction and short-circuits the input of the amplifier 8. The capacitor 6 can then be charged via the transistor 7. If the resistor 5, the output resistance of the amplifier 3, the resistance of the conducting transistor and the value of the capacitance 6 are suitably proportioned, the capacitor 6 can be charged to the threshold value voltage $u_s$ (compare FIG. 3a) during the pulse supplied by the threshold-value switch 9. After termination of the pulse from the threshold-value switch 9, the voltage at the input of the amplifier 8 again follows the output voltage $u_1$, but now at a level which has been lowered by the amount $u_2$. As soon as the voltage $u_2$ reaches the threshold value $u_s$ again, the capacitor 6 is charged to a voltage $u_1$ which now has a value $2u_2$. Subsequently, the voltage $u_2$ follows the voltage $u_1$ again at a level which has been lowered by the amount $u_2$, etc..

Each pulse thus implies a given variation of the logarithm of the dose and — as a linear relationship exists between the logarithm of the dose and the density — a given density variation on the film. The amount of the density variation depends on the threshold value $u_s$. This value can be varied by varying the amplification of the amplifier 8 and/or by changing the setting of the threshold-value switch 9. It was found to be advantageous to choose the threshold value such that a pulse is generated after each density variation of approximately 10 percent. A skilled observer can still observe a density variation of 10 percent. If the voltage $u_s$ is chosen such that, when using a film having a gamma of 2,5 (gamma = the slope of the density curve which lies between two and three in commonly used X-ray films with intensifying foil), the intensity each time increases by 10 percent, it is possible to cover a dose range $D_o/D_{55}$ of 1 : 160 while using only 55 pulses. For achieving the same result by means of an automatic exposure device where the number of generated pulses is proportional to the dose (DT-OS 1 916 31) approximately 1650 pulses would be required because the pulses have to be situated comparatively closely together at the beginning, and because this small distance would have to be maintained over the entire dose range (in the case of a linearly increasing dose the distances between the individual pulses are the same). This already demonstrates that the processing of the pulses is considerably simplified in an automatic exposure device according to the invention.

The dose $D_O$, at which the formation of the logarithm starts and which is the reference value therefor, is advantageously chosen such that the first pulse indicates the smallest dose required in the case of exposure of the most sensitive film-foil combination at the lowest density. In the above-mentioned example the reference dose $D_O$ then has to be only approximately 10 percent smaller than the said smallest switch-off dose.

Figure 3B:
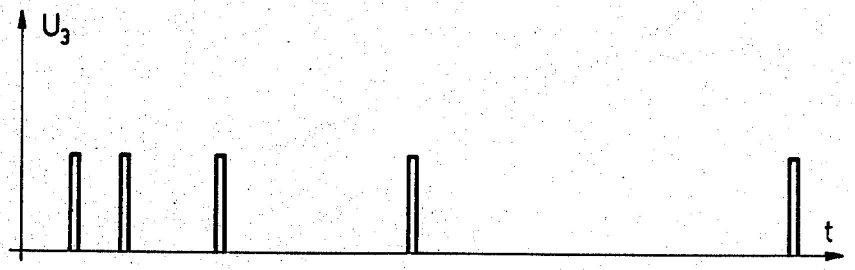

The pulses at the output of the threshold value switch 9 (compare FIG. 3*b*) are applied to the counter 10, which applies, via a supply line 5, a command for terminating the exposure to the switch after a selected number of pulses has been counted. The preselection of the pulse number at which switching-off is to be effected is realized by means of a presetting device 11. Fed into this presetting device are the data of the film-foil combination used, the voltage of the X-ray tube and the desired mean density. If desired, the voltage can be automatically coupled to the high voltage for an X-ray apparatus, not shown. This automatic exposure device could be used as follows.

The user uses a given film-foil combination which requires, for example, 22 pulses at a normal voltage at the X-ray tube (for example 80 kV) for a given density, (for example, 1.0). However, the user wishes to expose this film at an X-ray voltage of 100 kV and at a density of 1.3. The user then sets the presetting device to the film-foil combination used so that the counter would terminate the exposure only after 22 pulses. However, since a density of 1.3 is required, three additional pusles are to be counted so that the counter would switch off only after 25 pulses. Furthermore, because the user does not use 80 kV but 100 kV at which, for example, two pulses fewer are required, the presetting device ultimately chooses a pulse number of 22 to be counted before the counter applies a switch-off command to the switch.

Even though the invention was described with reference to an embodiment in which a signal proportional to the logarithm of the dose is quantized, the relevant advantages are also obtained without quantizing as comparatively few different switch-off voltages are required in an automatic exposure device of this kind.

What is claimed is:

1. An automatic X-ray exposure device for triggering a control device to terminate an X-ray exposure comprising, a radiation detector arranged between an object to be radiographed and an X-ray film for generating a signal proportional to the X-ray energy dose impinging on the film, an integrating circuit coupled to the detector so as to derive a signal corresponding to the X-ray energy accumulated on the film, a logarithmic amplifier connected to the output of the integrating circuit so as to derive a control signal at the output of the amplifier which is proportional to the logarithm of the integrated output signal, and means for applying said control signal to the control device.

2. An automatic X-ray exposure device as claimed in claim 1 further comprising means for biasing the logarithmic amplfier to a threshold voltage that is proportional to a reference value of X-ray dose so that the amplifier only provides said control signal after the reference dose is exceeded, said reference dose being approximately 10 percent smaller than the lowest X-ray dose required.

3. An automatic X-ray exposure device as claimed in claim 1 further comprising a quantizing device coupled to the amplifier output for quantizing the control signal, said quantizing device generating a number of pulses which is proportional to the amplitude of the control signal.

4. An automatic X-ray exposure device as claimed in claim 3, characterized in that the quantizing device is arranged so that the duration of the pulses supplied therefrom is less than the smallest time interval between two pulses to be anticipated at maximum dose power.

5. An automatic X-ray exposure device as claimed in claim 3 wherein said quantizing device comprises, a capacitor, a resistor, a threshold-value switch having an adjustable threshold value, means for coupling the control signal to the input of the switch via the series connection of said capacitor and resistor, said threshold-value switch being arranged to supply a pulse of a given duration when said adjustable threshold value is exceeded, means for applying said pulse to a transistor to drive same into conduction, and means connecting the transistor in circuit so that the capacitor is charged to the instantaneous value of the control signal.

6. An automatic X-ray exposure device as claimed in claim 3 further comprising means for applying the pulses to a counter which provides an output signal to activate the control device for terminating the exposure when a given count is reached in the counter, and a presetting device connected to the counter to adjust the value of the given count that will produce said output signal.

7. An automatic X-ray exposure device as claimed in claim 1 wherein said control signal applying means comprises pulse generating means for generating a number of pulses porportional to the amplitude of the control signal.

8. An automatic X-ray exposure device as claimed in claim 7 wherein said pulse generating means comprises, a capacitor, switching means having a threshold value at which it is activated, means for coupling the control signal to the input of the switching means via said capacitor, and means coupled to the capacitor and controlled by the output signal of the switching means for charging the capacitor to the instantaneous value of the control signal when the switching means is activated by the control signal.

* * * * *

PO-1050
(5/69)

UNITED STATES PATENT OFFICE
CERTIFICATE OF CORRECTION

Patent No. 3,792,267 Dated Feb. 12, 1974

Inventor(s) KURT WESTERKOWSKY

It is certified that error appears in the above-identified patent and that said Letters Patent are hereby corrected as shown below:

col. 1, line 6, cancel "a" (1st occurrence" and insert -- an x-ray --;

line 20, cancel "of" (last occurrence) and insert -- on --;

line 21, cancel "of" and insert -- on --;

line 27, after "film" insert a hyphen (-);

line 28, cancel the hyphen (-);

line 52, before "as" insert a comma (,);

line 56, before "in" insert a comma (,);

line 57, after "devices" insert a comma (,);

col. 2, line 20, before "a" insert a comma (,);

line 43, cancel "to" and insert -- on --;

line 49, cancel "using" and insert -- increasing --;

line 50, after "film" insert a comma (,);

col. 3, line 20, cancel "extended" and insert -- modified --;

FO-1050
(5/69)

UNITED STATES PATENT OFFICE
CERTIFICATE OF CORRECTION

Patent No. 3,792,267 Dated Feb. 12, 1974

Inventor(s) KURT WESTERKOWSKY PAGE - 2

It is certified that error appears in the above-identified patent and that said Letters Patent are hereby corrected as shown below:

col. 4, line 20, change "2,5" to -- 2.5 --;

line 27, cancel "DT-OS" and insert -- German patent --; after "3" insert -- 2 --;

line 47, cancel "5" and insert -- S --;

In the Title Page

Below "Foreign Application Priority Data" cancel "2062633" and insert -- P. 2062633.9 --.

Signed and sealed this 10th day of September 1974.

(SEAL)
Attest:

McCOY M. GIBSON, JR.
Attesting Officer

C. MARSHALL DANN
Commissioner of Patents